UNITED STATES PATENT OFFICE.

FRANCIS P. DUNNINGTON, OF CHARLOTTESVILLE, AND MILTON C. HILL, OF GORDONSVILLE, VIRGINIA.

COMPOSITION FOR REMOVING PAINT, VARNISH, AND THE LIKE.

1,177,938.    Specification of Letters Patent.    Patented Apr. 4, 1916.

No Drawing.    Application filed January 5, 1916.    Serial No. 70,508.

*To all whom it may concern:*

Be it known that we, FRANCIS P. DUNNINGTON and MILTON C. HILL, citizens of the United States, residing at Charlottesville and Gordonsville, respectively, in the counties of Albemarle and Orange and State of Virginia, have invented certain new and useful Improvements in Compositions for Removing Paint, Varnish, and the like, of which the following is a specification.

The invention relates to a composition for the removal of paints, varnishes and similar surface-coatings.

Paints, as ordinarily made, include linseed oil and closely kindred compounds; whereas, varnishes comprise a great variety of gums, resins, etc., the composition of many of which is practically unknown. Our composition is designed to be used effectively upon such paints and varnishes.

A primary object of the invention is to produce a composition which contains caustic soda and borax, but which shall have none of the corrosive action that is ordinarily inherent in the caustic soda and which, at the same time, possesses sufficient solvent power.

The invention, therefore, contemplates a composition produced by the mixing of caustic soda and borax, in such proportion of the borax that it will neutralize or remove the corrosive character of the caustic soda without materially reducing its solvent power to dissolve dry paints and varnishes. The substance so formed is only to be designated, technically, as trisodium ortho borate, as distinguished from any mixture of these bodies which when containing any larger proportion of caustic soda would include free sodium hydrate.

Another object of the invention is the production of a non-inflammable, non-corrosive composition which will readily eliminate or neutralize the binding properties of the surface-coatings to be removed, and which composition has no burning or other injurious effect upon the skin of the user, and which will not corrode, burn or stain the surfaces on which the coating is to be removed, nor the implement with which it is applied.

Many so-called "paint removers" contain oily substances or materials which combine with the oils in the surface-coating and leave a greasy residue after the coating has been loosened. This sometimes prevents the proper adherence of the next coat of paint to be applied thereto, wherefore it is another object of the present invention to provide a composition which shall contain no oily substances and which will not combine with the oils in the coating so as to leave an oleaginous scum, etc., but rather a soapy residue which may be washed off by cold water.

Still another object within the contemplation of the invention is to eliminate all obnoxious odors from the composition, the selection of its ingredients being such that no disagreeable odors prevail; and, moreover, these ingredients are all comparatively inexpensive.

Experiments have shown that if an insufficient quantity of the borax is employed, the neutralizing effect thereof on the caustic soda will not be sufficiently material to eliminate the corrosive action of the soda. In practice, we have found that the borax, to have sufficient neutralizing effect, should be in the proportion, approximately, of 1 to 1, or, exactly stated, the proportion of borax to the caustic soda would be as 382 of borax to 400 of soda. In other words, since borax has the composition

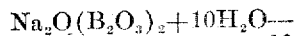
    382 molecular weight, and caustic soda is expressed by

10NaHO—400 molecular weight, when borax and caustic soda are mixed in equal amounts, we form

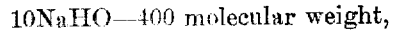

(*i. e.* a slight excess of borax) or trisodium ortho borate $4(Na_3BO_3)$, for the composition $H_3BO_3$ is that of boracic acid crystals.

It is important here to note the distinction between trisodium (neutral) ortho borate—which is our composition—and sodium acid borate or common borax which frequently but untechnically is called "sodium borate." To express this as sodium acid borate, the formula

must be written as

in which half of the water is basic (trisodium ortho phosphate is $Na_3PO_4$; sodium acid phosphate is $NaH_2PO_4$; and sodium acid borate or borax is $NaH_2B_2O_6$)—or

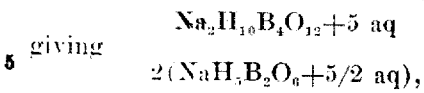
$$Na_2H_{10}B_4O_{12}+5 \text{ aq}$$

giving $$2(NaH_2B_2O_6+5/2 \text{ aq}),$$

and in which but one of the six atoms of hydrogen is replaced by the basic sodium, whereas, in our composition, all six of the atoms of basic hydrogen in the formula $H_6B_2O_6$ are replaced by sodium, forming $Na_6B_2O_6$ or $Na_3BO_3$, the recognized formula for boracic acid being $H_3BO_3$ or $H_6B_2O_6$.

The "sodium acid borate," called commercially "borax," has decided solvent effects upon some gums—such as shellac; but it has a weak or practically no solvent effect upon some other gums used in varnishes and paints; whereas, upon these last-mentioned gums, caustic soda would have an effective solvent action but, at the same time, would be seriously harmful because of its corrosive character. Now, by combining the borax with the caustic soda in a predetermined proportion, as already explained, we neutralize the corrosive action of the caustic soda without removing the solvent power which it has upon the latter substances, this solvent effect being, possibly, increased by the inherent solvent power of the borax. Therefore, with our improved form of composition, we are able to treat paints and some kinds of varnishes which heretofore have not yielded to the action of similar compositions of any non-corrosive watery liquids. Also included in our composition, preferably, is ammonia, in a proportion presently to be specified: Ammonia has a solvent effect upon many paints and varnishes but, because of its volatility, it would not remain sufficiently long in action to have proper solvent effect upon certain gums. As generally known, ammonia combines with acids, weak and strong. Paints and varnish gums include feebly acid bodies, that is, they are generally regarded as weakly acidic. The ammonia, similarly to caustic soda, ordinarily would combine with these weak acids; but, in our composition, we believe that in this mixture the boracic acid present tends to diminish the volatility of the ammonia so that it is less evanescent, wherefore, it will longer remain active and, consequently, have an increased solvent power upon the gums. Ammonia in combination with some weak organic acids has very peculiar solvent effects upon certain bodies ordinarily otherwise regarded as quite insoluble; for instance, ammonium citrate dissolving dicalcic phosphate, or ammonium acetate dissolving lead sulfate. Moreover, under the modern theory of hydrolysis, we are led to believe that the ammonia included in the mixture will be held therein to a greater extent than when employed alone, and in conjunction with the sodium borate the mixture becomes effective upon a greater range and variety of gums such as are used in making varnishes.

In using this composition or remover, the solutions may be employed in their clear state, or they may be mixed with some inactive powder, such as finely divided tripoli, and with a small amount of resin or other soap. The clear solvent can generally be used upon surfaces such as floors where the liquid may remain without running off, but where walls or other vertical surfaces are to be treated, that form having more body is preferred.

The preferred formula for the paste is as follows:

| | |
|---|---|
| Water of ammonia | 8 parts |
| Trisodium ortho borate | 2 parts |
| Sodium carbonate | 1 part |
| Water | 10 parts |
| | 21 parts |

The preferred formula for the paste is as follows:

| | |
|---|---|
| Stronger ammonia | 3 parts |
| Trisodium ortho borate | 2 parts |
| Sodium carbonate | 1 part |
| Common soap | 1 part |
| Water | 15 parts |
| Tripoli or diatomaceous earth | 10 parts |
| | 32 parts |

The sodium carbonate is preferably introduced into the mixture so as to strengthen the solution, and also it has a thickening effect thereon. It also cheapens the composition, in that less of the sodium borate is required. It is to be understood, of course, that it may be omitted.

It is to be understood that "water of ammonia" is always 10% (U. S. P.); while "stronger ammonia" is 28% (U. S. P.). Therefore in the first mentioned formula the water of ammonia, of 8 parts, contains 8/10 parts ammonia gas and 7.2 parts water while in the second formula the stronger ammonia, 3 parts, contains 84/100 parts ammonia gas and 2.16 parts of water. The trisodium orthoborate and the sodium carbonate is the same in each formula and the amount of water of crystallization in these brings the water up to approximately 20 parts. Understanding these as of U. S. P. strength, we see that the expressions harmonize. In mixing and using so strong solutions of ammonia, necessarily it escapes to an uncertain extent, so that no exact figures can be expected to obtain. Obviously, the proportions of these various ingredients may be varied considerably without departing from the spirit of the invention; and some of them may be entirely omitted, so long as the sodium borate (as technically hereinabove expressed) is retained, with or without the ammonia. The composition, in addition to being non-corrosive, is non-inflammable.

From the foregoing, it will be perceived that we have produced a composition which is comparatively inexpensive to manufacture, is easily applied, has no corrosive action upon the skin of the user, is non-inflammable, and is very effective in performing its function.

What we claim is:

1. A non-corrosive, non-inflammable composition for removing paint, varnish and similar surface-coatings, which includes caustic soda and a borate in proportion to remove the corrosive character of the soda.

2. A non-corrosive, non-inflammable composition for removing paint, varnish and similar surface-coatings, which includes caustic soda and boracic acid in proportion to remove the corrosive character of the soda.

3. A non-corrosive, non-inflammable composition for removing paint, varnish and similar surface-coatings, which includes caustic soda and a borate in proportion to remove the corrosive character of the soda, and ammonia.

4. A non-corrosive, non-inflammable composition for removing paint, varnish and similar surface-coatings, which includes caustic soda and boracic acid in proportion to remove the corrosive character of the soda, and ammonia.

5. A non-corrosive, non-inflammable composition for removing paint, varnish and similar surface-coatings, which includes caustic soda, borax and ammonia-gas, in substantially equal proportion.

6. A composition for removing paints, varnishes and similar surface-coatings, which includes, approximately, 2 parts of trisodium ortho borate, approximately 1 part of ammonia-gas, approximately 1 part of carbonate of soda, approximately 20 parts of water, and a thickening substance comprising a diatomaceous earth.

7. A composition for removing paints, varnishes and similar surface-coatings, which includes, approximately, 2 parts of trisodium ortho borate, approximately 1 part of ammonia-gas, approximately 1 part of carbonate of soda, approximately 20 parts of water, a thickening substance comprising a diatomaceous earth, and soap.

In testimony whereof we affix our signatures in presence of two witnesses.

FRANCIS P. DUNNINGTON.
MILTON C. HILL.

Witnesses:
R. M. McClure,
J. C. Graves.

It is hereby certified that in Letters Patent No. 1,177,938, granted April 4, 1916, upon the application of Francis P. Dunnington, of Charlottesville, and Milton C. Hill, of Gordonsville, Virginia for an improvement in "Compositions for Removing Paint, Varnish, and the like," an error appears in the printed specification requiring correction as follows: Page 2, line 81, for the word "paste" read *liquid composition;* and that the said Letters Patent should be read with this correction therein that the same may conform to the record of the case in the Patent Office.

Signed and sealed this 18th day of July, A. D., 1916.

[SEAL.]
R. F. WHITEHEAD,
*Acting Commissioner of Patents.*

Cl. 87—5.